Oct. 30, 1928.

W. B. MOORE 1,689,496

CONVEYER ROLLER

Filed March 2, 1925

INVENTOR:
Whitley B. Moore

HIS ATTORNEYS

Patented Oct. 30, 1928.

1,689,496

UNITED STATES PATENT OFFICE.

WHITLEY B. MOORE, OF CANTON, OHIO, ASSIGNOR TO THE TIMKEN ROLLER BEARING COMPANY, OF CANTON, OHIO, A CORPORATION OF OHIO.

CONVEYER ROLLER.

Application filed March 2, 1925. Serial No. 12,628.

My invention relates to conveyer rollers and has for its principal object a roller that is light in weight, simple in construction, durable and particularly adapted for use with roller bearings.

The invention consists principally in providing a hollow conveyer roller with an inner tubular member having flanged ends secured to the roller and in the parts and combinations of parts hereinafter described and claimed.

In the accompanying drawing which forms part of this specification and wherein like reference numerals indicate like parts wherever they occur, Fig. 1 is a longtiudinal sectional view of a roller embodying my invention;

Figure 1:
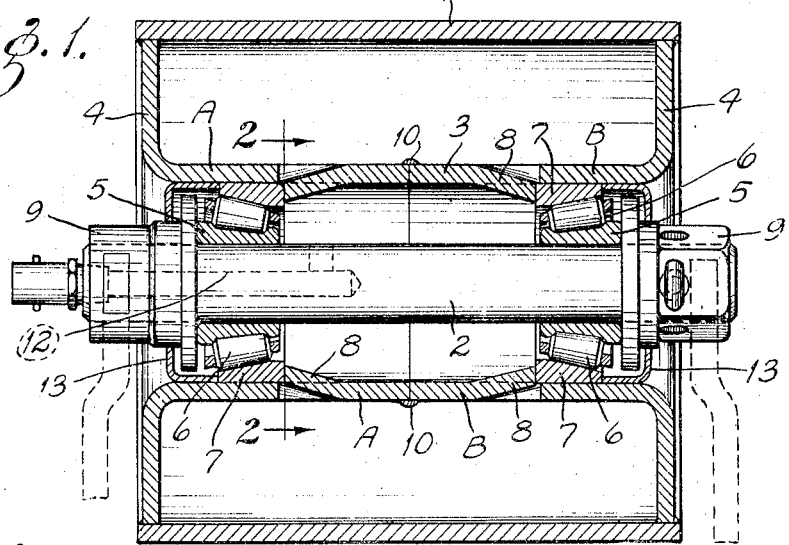

A hollow roller 1, as a belt conveyer roller, is mounted on a shaft 2. Said roller comprises a cylindrical shell and a tubular member 3 extending therethrough and having annular end flanges 4 that are secured to the inside of the roller 1, as by welding. At the ends of said shaft 2 are mounted the cones 5 of conical roller bearings. The conical rollers 6 are mounted on said cones 5 and cups 7 or outer bearing members are mounted in the ends of the bore of the tubular member 3. Said tubular member 3 has portions 8 struck up therefrom that project into the bore thereof to form abutments for said bearing cups 7. The shaft 2 is provided with adjusting nuts 9 for adjusting the positions of the bearing cones 5.

Preferably the tubular inner member 3 of the roller is made in two parts, A and B, which parts are welded together, as indicated at 10. In the form shown in the drawing, the line of weld 10 is perpendicular to the axis of the tube; but if desired, the line of weld may be made parallel with the axis of the tube.

Figure 4:
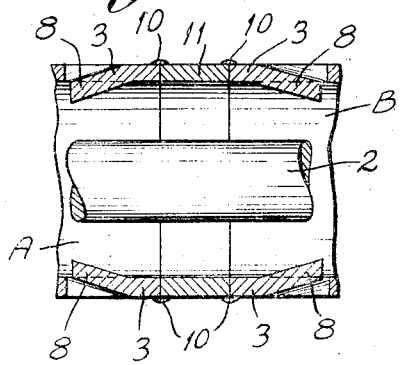
Fig. 4 is a fragmentary sectional view of a modification.
Figure 2:
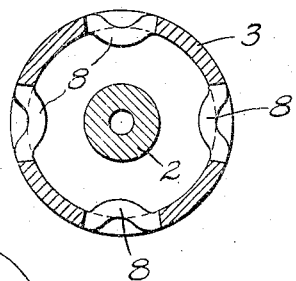
Fig. 2 is a fragmentary cross-sectional view thereof on the line 2—2 of Fig. 1.

Instead of being welded together, (as shown in Fig. 1) the members A and B may be welded to an intermediate tubular member 11, as shown in Fig. 4.

The shaft is provided with a bore 12 through a portion of its length to permit entry of lubricant to the bearings. Suitable lubricant retainers 13 may be provided to prevent escape of lubricant from the bearings.

Figure 3:
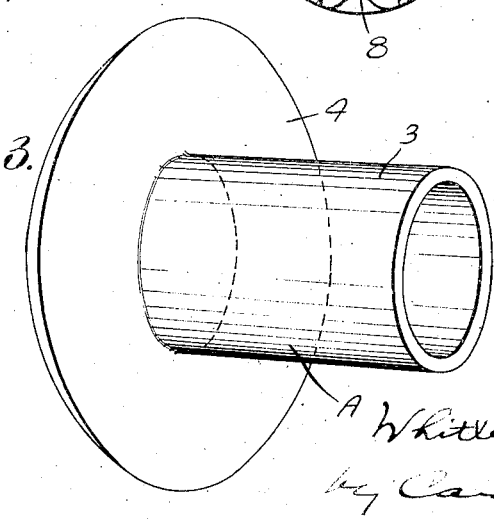
Fig. 3 is a perspective view of a portion of the inner tubular member.

In Fig. 3 is indicated the process of making the tubular member A shown in Fig. 1. A cylindrical member is provided, in any suitable way, with an annular end flange 4 that is substantially perpendicular to the axis of the tube. The member A shown in Figure 3 is welded to a similar member to produce the complete tubular member 3 having an annular flange 4 at each end. This tubular member is placed in the roller and the end flanges secured to the roller, as by welding.

The above described roller construction is light, durable and easy and economical to make. It is especially adapted for use with anti-friction bearings.

Obviously numerous changes may be made without departing from the invention and I do not wish to be limited to the precise construction shown.

What I claim is:

A shaft, a hollow roller rotatably mounted thereon, a tubular member extending through said roller, and conical roller bearings comprising cones, cups and rollers interposed between said shaft and said tubular member, said tubular member having portions struck up therefrom and constituting abutments for the cups of said roller bearings.

Signed at Canton, Ohio, this 17 day of February, 1925.

WHITLEY B. MOORE.